Aug. 7, 1923.

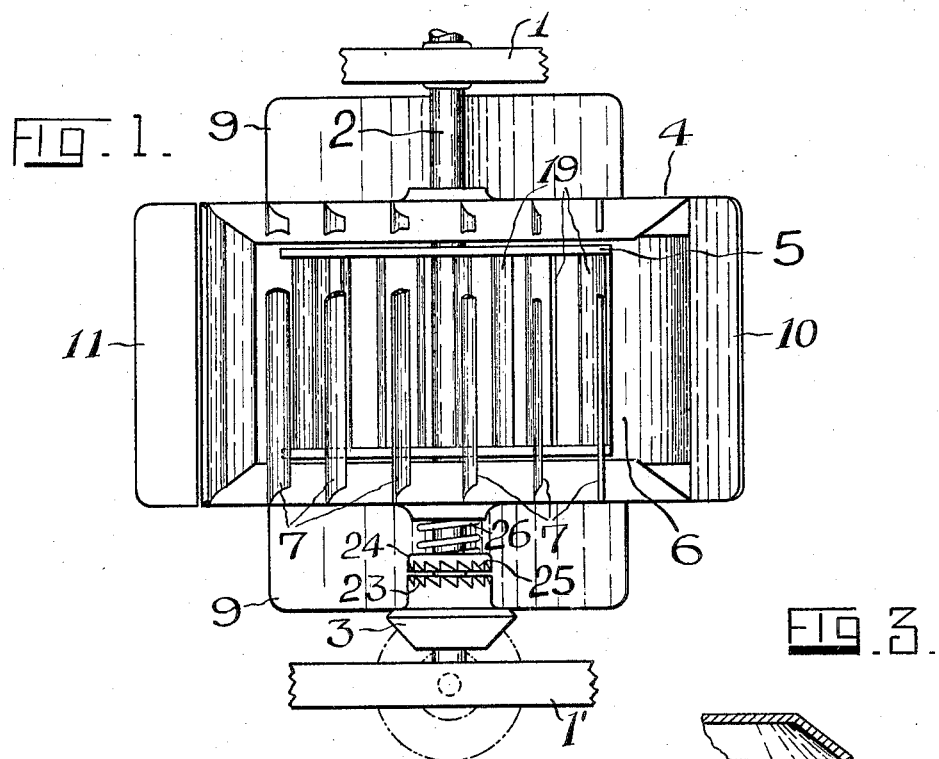

Y. OZAKI 1,463,924

WIND TURBINE

Filed May 3, 1922   3 Sheets-Sheet 2

Inventor
YUKITERU OZAKI
By Richards & Geier
Attorneys

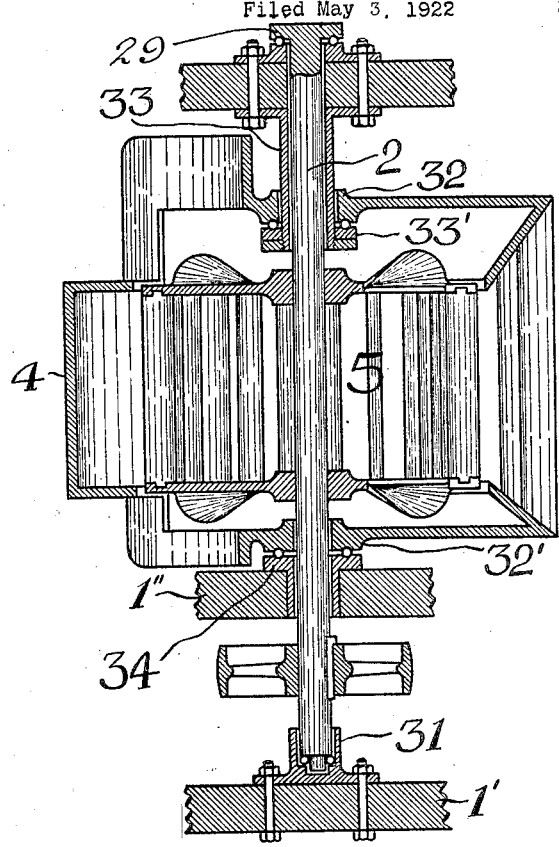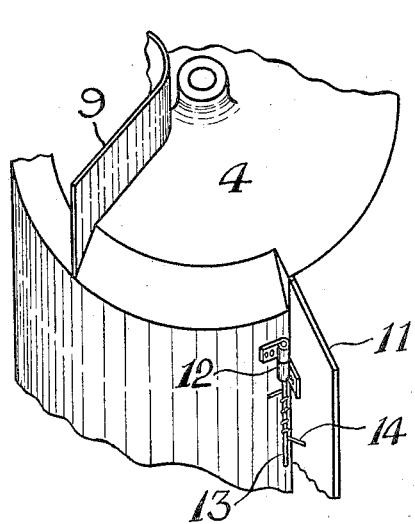

Patented Aug. 7, 1923.

1,463,924

UNITED STATES PATENT OFFICE.

YUKITERU OZAKI, OF SHIROTA-MURA, JAPAN.

WIND TURBINE.

Application filed May 3, 1922. Serial No. 558,212.

*To all whom it may concern:*

Be it known that I, YUKITERU OZAKI, subject of the Emperor of Japan, residing at 62 Kabata, Shirota-mura, Watarai District, Japan, have invented certain new and useful Improvements in Wind Turbines; and I do hereby declare the following to be a full, clear, and exact description of the invention, such as will enable others skilled in the art to which it appertains to make and use the same.

This invention relates to an improved wind-turbine comprising a drum freely and rotatably mounted on a vertical shaft, and a rotary wheel arranged within the said drum and secured to the said vertical shaft.

The object of the present invention is to provide an improved wind-turbine in which the drum may be turned automatically in accordance with the direction of the wind so that the inlet ports on the said drum may be always held towards the wind, and further to cause the wind coming through the said ports to act on the moving vanes of the rotary wheel so as to rotate the latter and finally to utilize the power thus obtained for any desired purpose.

Preferred embodiments of the present invention are shown in the accompanying drawings, in which:—

Fig. 1 is a front view of a wind-turbine, according to this invention.

Fig. 2 is a plan view of the same partly in section.

Fig. 3 is a detail sectional view taken on line A—B of Fig. 2.

Fig. 6 is a sectional elevation of a modified form of the wind-turbine, according to this invention, and Fig. 7 is a perspective view of a part of a drum or casing.

The wind-turbine, according to this invention, consists of a rotary wheel, a case drum covering the said rotary wheel, a shaft supporting the above two parts and frames, the construction and operation of each part of which will be fully described hereinafter, with reference to the accompanying drawings.

Figure 4:
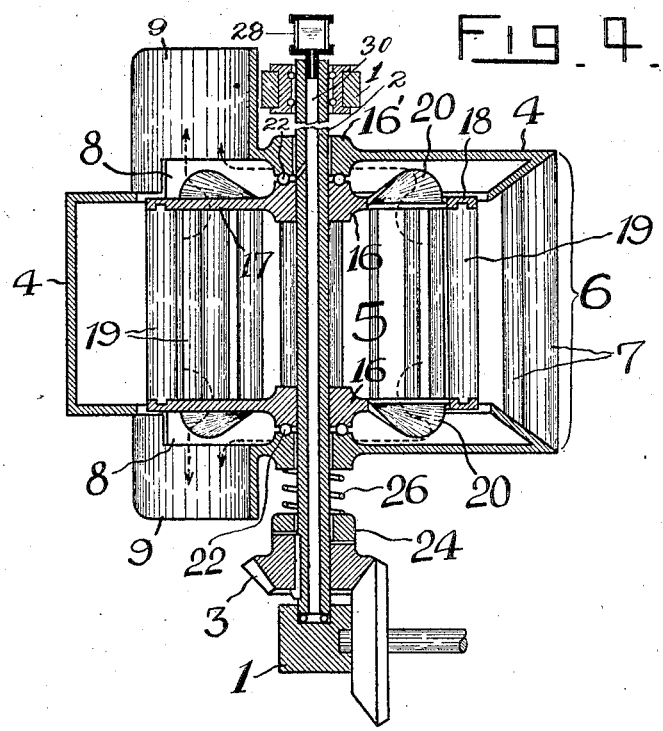
Fig. 4 is a sectional elevation taken on line C—D of Fig. 2.

On frames 1, 1' suitably disposed on the ground or earth is mounted a vertical shaft 2, the lower end of which is supported by the frame 1' and has a bevel wheel 3 secured thereto, as shown in Figs. 1 and 4. On the said shaft is freely mounted a drum 4 so as to be adapted for rotation, while within the said drum is provided a rotary wheel 5 which is secured to the shaft 2. On the front half side of the drum 4 is formed a wind inlet port 6 having a plurality of guide vanes 7 arranged therein, while the back portion of the said drum has wind exhaust ports 8 arranged on the upper and lower sides of the same. Mounted on the peripheral edge of each exhaust port 8 is a direction plate 9 which is adapted to rotate the drum against the wind so that the inlet ports on the front side of same may be always held towards the flow of the wind. On one of the side edges of the inlet port 6 is provided a guide plate 10 which is adapted to guide the wind into the drum; and on the opposite side of the said inlet port is provided a balance plate 11 which is pivotally connected to the drum by hinges 12, as shown in Fig. 7. The balance plate 11 is normally urged outwardly to the position shown in Fig. 2 by means of a spiral torsion spring 14 coiled around the pivot 13 of the said hinges. The said balance plate retains the balance of the drum and keeps the inlet port 6 into the face of the blowing wind by co-acting with the guide plate 10, but, when a strong wind comes abruptly, the said balance plate will turn as shown in dotted lines whereby balance of the drum will become disturbed because the wind will attack only on the guide plate 10, and not on the balance plate 11. When the drum thus has lost its balance, it will turn in the direction of an arrow 15, consequently, the wind confronting area of the inlet ports will decrease, with the result that the volume of the wind passing therethrough to act on the moving vanes on the rotary shaft will also be reduced, and therefore, the speed of rotation of the rotary shaft 2 will not alter much, notwithstanding the wind being very much stronger.

The rotary wheel 5 consists of the top and bottom walls 16 having at their central portions a boss by means of which the wheel is secured to the shaft 2. Each of the walls 16 have a plurality of outwardly pressed portions to form the exhaust vanes 20, a rib 17 being left between each vane which ribs extend from and connect the bosses 16 with an annular rim portion 17ª. Extending vertically between and connecting the top and bottom walls 16 is a plurality of vanes 19 against which the wind coming through the inlet ports 6 impinges to rotate the wheel, the wind being driven out of the top and bottom of the wheel by the exhaust vanes through the outlet.

On account of the speed of its rotation, the rotary wheel has a tendency to drive off a certain part of the wind by the centrifugal force, and the wind thus driven off will be forced against the side wall of the drum and be again reflected therefrom on to the moving vanes to rotate the rotary wheel. Into the outer side faces of the bosses of the walls 16 of the said rotary wheel are engaged several antifriction balls 22, and as the drum is supported by these balls, it may rotate relatively to the vertical shaft 2. On the upper face of the bevel gear 3, which is freely mounted on the lower part of the vertical shaft, is provided a plurality of clutch teeth 23 which are adapted to engage with the teeth 25 of a one-way clutch 24. The clutch 24 is normally pressed down on the teeth 23 by a spiral spring 26 twisted around the shaft 2, and the upper end of the said spring engages against the boss of the lower wall of the drum, consequently, when the shaft 2 is rotated in the direction of an arrow 15, the bevel gear 3 is also turned around in the same direction, and in the contrary case, however, due to the construction of the clutch teeth the latter will not be affected by the rotation of the shaft 2. The vertical shaft 2 is a hollow one, and has an oil cup 28 attached to the top thereof which serves to feed the oil from the said oil-cup to each of the rotary parts of the apparatus through the conduit 30.

In the modification shown in Fig. 6 the vertical shaft 2 carries a flange 29 at its top, and is hung from the frame 1 by means of the said flange which is mounted on the ball bearing carried by the said frame, and the lower end of the vertical shaft is held by a bearing 31 provided in the other frame 1′. In this form of the invention the wheel 5 is secured to the shaft and is mounted within the casing 4, the shaft and casing being relatively rotatable and the construction being similar to that heretofore described, but differing therefrom in the following particulars, the inner face of the boss 32 of the upper wall of the drum rests upon the flange 33′ of the pipe 33 hung from the frame 1, and the boss 32′ of the lower wall is supported by the thrust bearing 34 provided in the frame 1″. In each bearing antifriction balls are interposed so that the shaft and the case drum may rotate easily.

Figure 5:
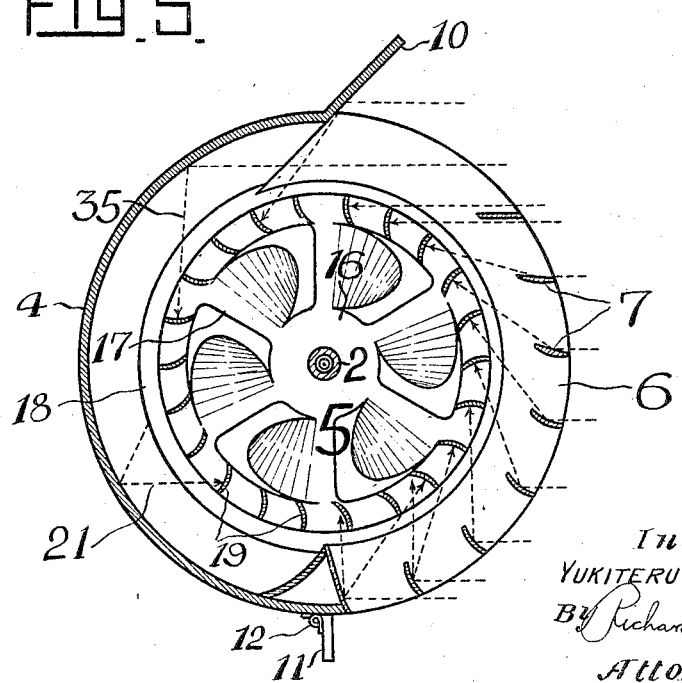
Fig. 5 is a horizontal sectional plan view of Fig. 1.

The operation of the wind-turbine thus constructed in accordance with the invention is as follows. The wind coming from any direction will act, in the first place, on the direction plate 9, turning the drum without regard to the shaft 2 so that the inlet port 6 may always confront the blowing direction of the wind, and, the wind coming through the said port, in the second place, will be reflected by the guide vanes 7, to the moving vanes 19, to rotate the rotary wheel 5. The wind impinging on the guide plate 10 will be guided by the said plate to the rotary wheel and will also be reflected from the side wall of the drum, as shown by an arrow 35, Fig. 5 to the moving vanes 19 to rotate the rotary wheel. The wind which has rotated the rotary wheel has already lost a considerable amount of its energy, and so it will be driven off by the vanes 20 arranged on the upper and lower walls of the rotary wheel, outside of the wheel, and then out of the drum through the exhaust ports 8. The operation of the balance plate 11 and the clutch 24 is as heretofore described.

Having thus described my invention, what I claim as new and desire to secure by Letters Patent is:—

1. In a wind turbine, a cylindrical casing having an inlet opening, a plurality of deflecting vanes mounted in said casing and extending across said inlet opening, a rotary shaft passing through said casing, a turbine wheel having upper and lower substantially circular walls secured to said shaft, a plurality of reaction vanes extending between said walls adjacent the circumference thereof, the upper and lower walls of said casing being provided with exhaust opening diametrically opposite to said inlet opening and the upper and lower walls of said turbine wheel being provided with a plurality of exhaust openings each having an outwardly projecting vane arranged to direct the air towards the exhaust openings of said casing.

2. A wind turbine as set forth in claim 1 in which said casing is rotatably mounted on said shaft and is provided with direction vanes to hold said inlet opening into the face of the wind.

3. A wind turbine as set forth in claim 1 in which said casing is rotatably mounted on said shaft, direction vanes to hold said inlet opening into the face of the wind, and a one-way clutch is provided to allow relative rotation of said casing and wheel in one direction only.

4. A wind turbine as set forth in claim 3 in which a guide plate is pivotally mounted on said casing adjacent said inlet opening, and resilient means are provided to normally hold said guide plate normal to the circumference of said casing.

In testimony whereof I affix my signature.

YUKITERU OZAKI.